H. MEYER.
TRACTOR.
APPLICATION FILED FEB. 7, 1921.

1,399,639.

Patented Dec. 6, 1921.
4 SHEETS—SHEET 1.

Henry Meyer
INVENTOR

BY Victor J. Evans
ATTORNEY

WITNESS:

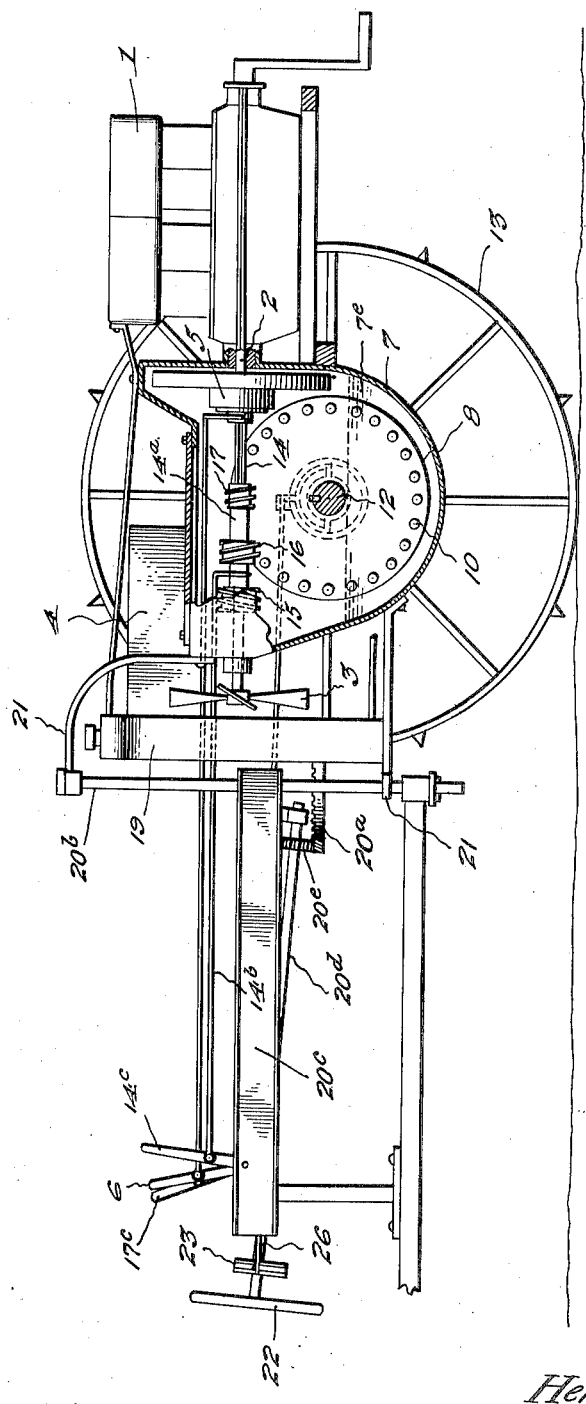

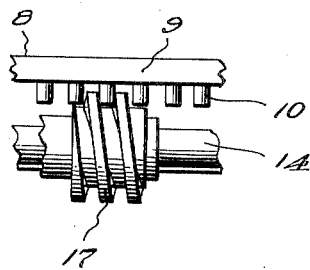
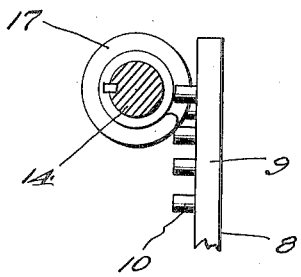
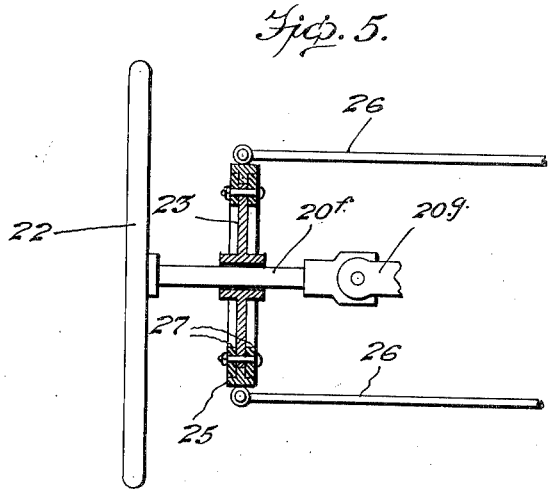
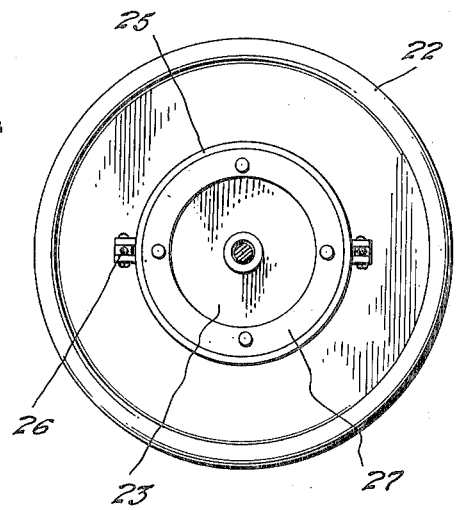

H. MEYER.
TRACTOR.
APPLICATION FILED FEB. 7, 1921.
1,399,639.
Patented Dec. 6, 1921.
4 SHEETS—SHEET 4.
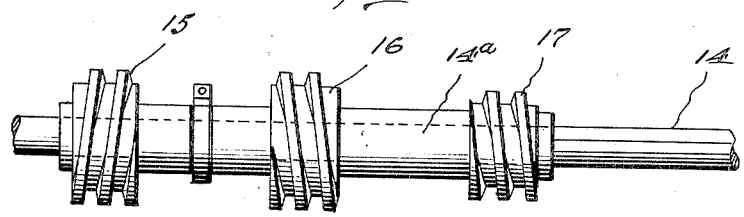
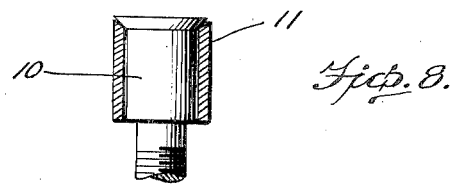
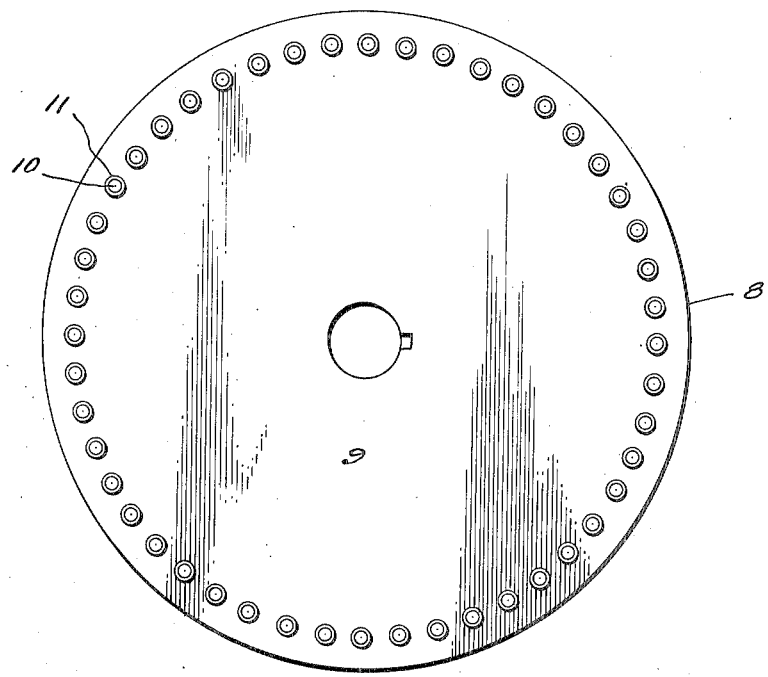
Henry Meyer, INVENTOR
WITNESSES
BY Victor J. Evans
ATTORNEY

UNITED STATES PATENT OFFICE.

HENRY MEYER, OF RHINELAND, MISSOURI.

TRACTOR.

1,399,639.

Specification of Letters Patent.  Patented Dec. 6, 1921.

Application filed February 7, 1921. Serial No. 443,116.

*To all whom it may concern:*

Be it known that I, HENRY MEYER, a citizen of the United States, residing at Rhineland, in the county of Montgomery and State of Missouri, have invented new and useful Improvements in Tractors, of which the following is a specification.

My present invention pertains to tractors and more particularly to the general construction and the means for transmitting motion from the motor to the drive wheels.

One of the objects of my invention is the provision of a simplified, compact and strong general construction of tractor.

Another object is the provision of driving and control means between the motor and the drive wheels; the said means being a material simplification of analogous means extant and being constructed and arranged in such manner that the driver is enabled to handle the propulsion of the tractor to the very best advantage, involving the driving of the tractor forwardly at various speeds and the general handling of the tractor for agricultural purposes.

Another object is the provision in a tractor of improved steering means.

To the attainment of the foregoing the invention consists in the improvement as hereinafter described and definitely claimed.

In the accompanying drawings, hereby made a part hereof:—

Fig. 2 is a side elevation of the tractor.

Fig. 3 is a detail plan of a portion of the gearing.

Fig. 4 is an enlarged detail view taken at right angles to Fig. 3.

Fig. 5 is an enlarged detail view of a portion of the steering mechanism.

Fig. 6 is a detail view in side elevation of the anti-friction gear included in my improvement.

Fig. 7 is a detail view of the worm equipment that coöperates with said gear.

Fig. 8 shows a detail comprised in the improved construction.

Fig. 9 is a view at right angles to Fig. 5 of the steering mechanism.

Similar numerals of reference designate corresponding parts in all of the views of the drawings.

Figure 1:
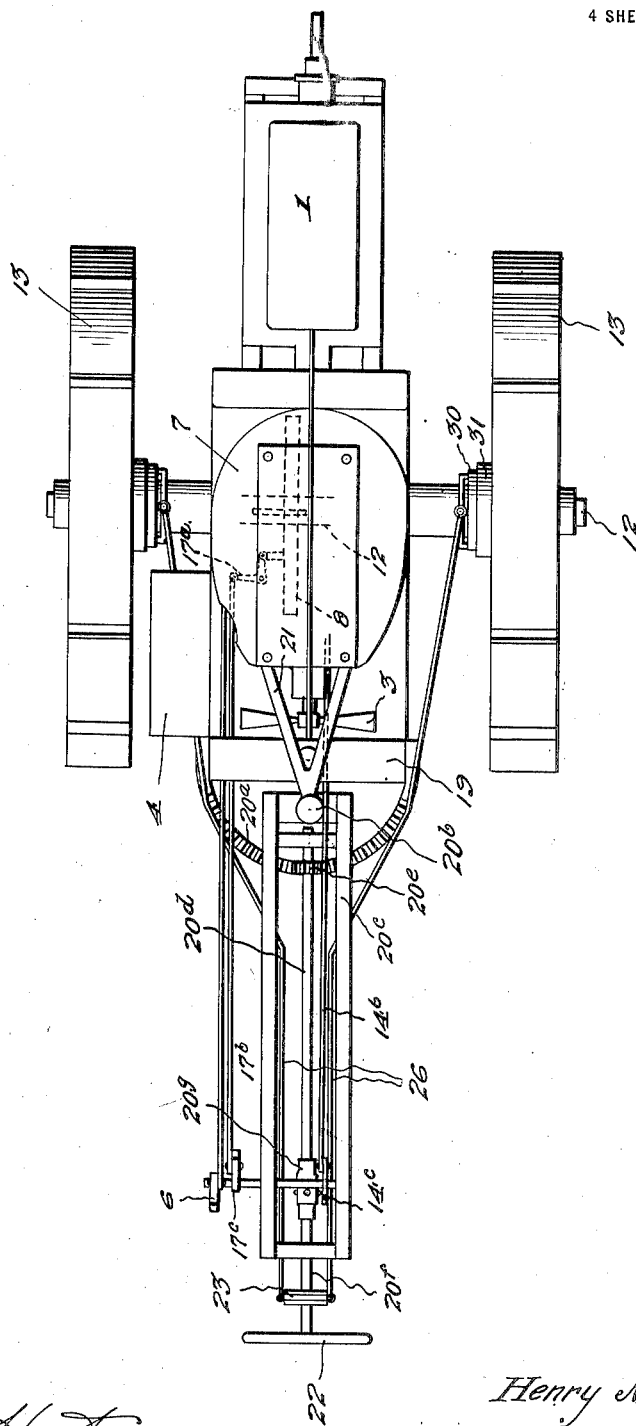
Figure 1 is a plan view of the tractor constituting the best practical embodiment of my invention known to me.

Among other elements my novel tractor includes an internal combustion motor 1, the drive shaft of which is numbered 2. Fastened to the drive shaft 2 is a fan 3, this arrangement rendering unnecessary the employment of a fan belt or belts and the appurtenances generally associated therewith. At one side of the fan 3 is located a gasolene tank 4. This tank 4 is also located at one side of the gear casing 7 and therefore it is not calculated to interfere in any measure with access being gained to the gear casing through the usual normally-closed opening. In the rear portion of the casing 7 is located a clutch 5, connected with a lever 6. In said gear casing 7 is disposed the anti-friction gear 8 that constitutes a highly important feature of my invention. The said gear 8 comprises a body or disk 9 and a circular series of lateral studs 10 on which studs 10 are mounted anti-friction rollers 11, Figs. 6 and 8. The gear 8 is splined on the axle or shaft 12 of the ground wheels or drive wheels 13, and is therefore susceptible of being laterally adjusted on the axle or shaft for an important purpose hereinafter set forth. At 14 is a longitudinal shaft that is connected with the rear member of the clutch 5, and is designed to serve an important purpose in combination with the gear 8, and at 14$^a$ is a sleeve feathered on the shaft 14. The said sleeve 14$^a$ is provided with a reverse worm 15, a high speed worm 16, and a low speed worm 17.

At 17$^a$ is a bell crank which is connected with and is adapted to move the feathered gear 8 laterally on the axle 12 to permit of shifting of the sleeve 14$^a$ and the worms 15, 16, and 17 thereon. The said bell crank 17$^a$ is connected through a rod 17$^b$ with a lever 17$^c$ within convenient reach of the operator of the tractor.

Relatively arranged as shown to the gear casing 7 and the fan 3 is a radiator 19.

The casing 7 is designed to contain oil as indicated by 7$^e$ so as to enable the gear 8 to take up oil and bring about thorough lubrication of the gearing by the splash system.

Connected by a rod 14$^b$ with the sleeve 14$^a$ is a lever 14$^c$ within convenient reach of the operator of the tractor.

My invention also includes novel and advantageous steering mechanism. This mechanism includes an arcuate rack 20$^a$ fixed with respect to the axle 12, an upright shaft 20ᵇ connected to the members 21, a sub-frame 20ᶜ connected to said upright shaft 20ᵇ, a shaft 20ᵈ journaled in bearings carried by the sub-frame 20ᶜ and having a spur gear 20ᵉ intermeshed with the arcuate rack 20ᵃ, and a laterally movable shaft 20ᶠ connected through a universal joint 20ᵍ with the shaft 20ᵈ, and equipped at its rear end with a steering wheel 22. Manifestly when the wheel 22 is turned about its center the shafts 20ᶠ and 20ᵈ will be turned for the slow turning of the tractor toward the right or left. The steering mechanism also comprises a disk 23 in which the shaft 20ᶠ is rotatable and which is movable laterally with the said shaft 20ᶠ. Connected to the said disk 23 are annuli 27 between which is loosely arranged the inwardly extending portion of an annulus 25. Connected at diametrically opposite points to the said annulus 25 are longitudinal rods 26. These rods 26 are appropriately connected at their forward ends to clutch members 30 complementary to clutch members 31 carried by the ground wheels 13; it being understood in this connection that the ground wheels are loose on the axle 12 and that the clutch members 30 are feathered or otherwise mounted to rotate with and be capable of movement in the direction of the length of the said axle 12. Manifestly when the shaft 20ᶠ is swung laterally in one direction one of the wheels 13 will be rendered loose on the axle 12 to facilitate the making of a quick turn, and when the shaft 20ᶠ is swung laterally in the other direction the other wheel 13 will be rendered loose on the axle 12 to facilitate the making of a quick turn.

It will be apparent from the foregoing that my improvement includes improved means for transmitting motion from the shaft to the internal combustion motor to the axle 12, improved means to lubricate the driving connections in the casing 7, and improved means whereby the tractor at the will of the operator may be turned slowly or quickly with but little effort on the part of the operator.

Having described my invention, what I claim and desire to secure by Letters-Patent, is:—

1. Driving means for tractors and the like including an axle bearing ground or drive wheels, means carrying the same, a gear splined and movable laterally on the axle and characterized by anti-friction rollers at the side thereof, means to shift said gear, and shiftable means for coöperation with the gear; the said shiftable means equipped with three worms for alternate engagement with the anti-friction rollers.

2. The combination in a tractor, of a frame, an axle, drive wheels on the axle, clutches complementary to the drive wheels, a motor on the frame in front of the axle and having a drive shaft and a fan thereon, a sleeve splined on the drive shaft and equipped with worms, a gear having rollers at the side thereof for coöperation with the sleeve, said worm gear splined on the axle and capable of being moved laterally, means to so move the gear, means to shift the sleeve, manual means to operate the clutches, and manual means for the slow turning of the tractor.

3. In a tractor, the combination of an axle, ground wheels loose thereon, clutch members splined on the axle and movable into and out of engagement with complementary clutch members on the wheels, a gear sector connected with the axle, a shaft having a spur gear intermeshed with the said gear sector, means carrying said shaft, a second shaft equipped with a steering wheel, a universal joint between the two shafts, a disk loosely receiving and movable laterally with the second named shaft, and connections between the said disk and the clutch members splined on the axle to move the latter by the former.

In testimony whereof I affix my signature.

HENRY MEYER.